United States Patent [19]

Voth et al.

[11] 3,957,468

[45] May 18, 1976

[54] CARBURETOR

[76] Inventors: John J. Voth; Jacob E. Voth, both of P.O. Box 157, Lac La Hache, British Columbia, Canada

[22] Filed: Oct. 28, 1963

[21] Appl. No.: 319,104

[52] U.S. Cl. .................................... 55/259; 55/223; 55/229; 55/442; 261/115; 261/118; 261/36 A; 261/113

[51] Int. Cl.² ........................................... B01D 47/00

[58] Field of Search ............... 55/80, 83, 84, 89, 90, 55/95, 97, 220, 227, 229, 240, 241, 257, 248, 259, 315, 318, 319, 320, 323, 329, 434, 442, 443, 444, 445, 462, 465, 250, 251, 252, 525; 261/115, 118, 36.1, 113

[56] References Cited

UNITED STATES PATENTS

| | | | |
|---|---|---|---|
| 297,039 | 4/1884 | Wallace | 55/259 |
| 1,492,616 | 5/1924 | White | 55/248 X |
| 1,563,125 | 11/1925 | Ward | 55/257 |
| 1,747,066 | 2/1930 | Gaston | 261/95 |
| 1,922,469 | 8/1933 | Borthwick | 55/219 |
| 2,256,374 | 9/1941 | Cummings, Jr. | 55/90 |
| 2,322,513 | 6/1943 | Goodloe | 55/525 X |

*Primary Examiner*—Harry B. Thornton
*Assistant Examiner*—Bernard Nozick

EXEMPLARY CLAIM

1. A carburetor comprising a vertically elongated casing having an inlet port adjacent but spaced above its lower end and having an outlet port spaced above said inlet port, a series of horizontally elongated vertically spaced baffles in the casing arranged so that adjacent baffles are connected at opposite ends to opposite walls of the casing to form a tortuous passage between the inlet port and outlet port, the lowermost of said baffles being spaced above the inlet port and bottom of the casing to form a mixing chamber, a blower at the inlet port to pass a stream of air through the mixing chamber, a plurality of atomizing nozzles arranged in the mixing chamber above the stream of air being adapted when connected to a source of liquid fuel to discharge said fuel into said stream of air so as to produce an air-fuel mixture, a filter arranged in the passage to remove fuel in liquid form from said mixture, each of said baffles being provided with an aperture adjacent its connected end to permit fuel in liquid form collected thereon to pass therethrough and return to the mixing chamber, a sump arranged below the mixing chamber to receive said liquid fuel, and valve means automatically openable when the liquid fuel in the sump has reached a predetermined level to permit draining of said fuel therefrom.

2 Claims, 4 Drawing Figures

CARBURETOR

This invention relates to carburetors and more specifically to carburetors for mixing air and liquid fuels, such as gasoline or liquids of a highly volatile nature. In the carburization of liquid fuels, especially where said fuels are used in reciprocating combustion engines, it is important that proper vaporization of the fuel takes place. If excessive non-vaporized fuel is released into the cylinders of an reciprocating engine, the ultimate result will be incomplete combustion and a consequent fire consumption of fuel. In an attempt to produce complete vaporization of the fuel, various means of spraying the fuel into the air as it passes through the carburetor have been developed. However, the inability of the conventional reciprocating combustion engine to utilize the whole power or the value of the fuel used, still remains a well known fact, due primarily to the inability of the present carburetors to fully vaporize the fuel before it enters the cylinders of the engine.

The present invention provides a carburetor, which, besides providing means to more fully vaporize the liquid fuel, also provides a means whereby any liquid fuel not vaporized is filtered from the air fuel mixture before it enters the cylinders of the engine thereby reducing the amount of unburnt fuel in the end products of combustion. The present invention although specifically designed for use in internal combustion engines, as hereinbefore described, is not so limited that it is restricted thereto, but may be used in circumstances where fuel vapor in ridged air is required in the production of heat light, or other such purposes.

The present invention comprises a carburetor having an air passage, therethrough means for moving a stream of air through the passage, means for emitting a spray of liquid fuel into the stream of air whereby a portion of the liquid fuel is vaporized in the air, and filter means in the passage to remove non-vaporized fuel from the air-fuel mixture.

In the drawings which illustrate the embodiments of the invention,

Figure 1:
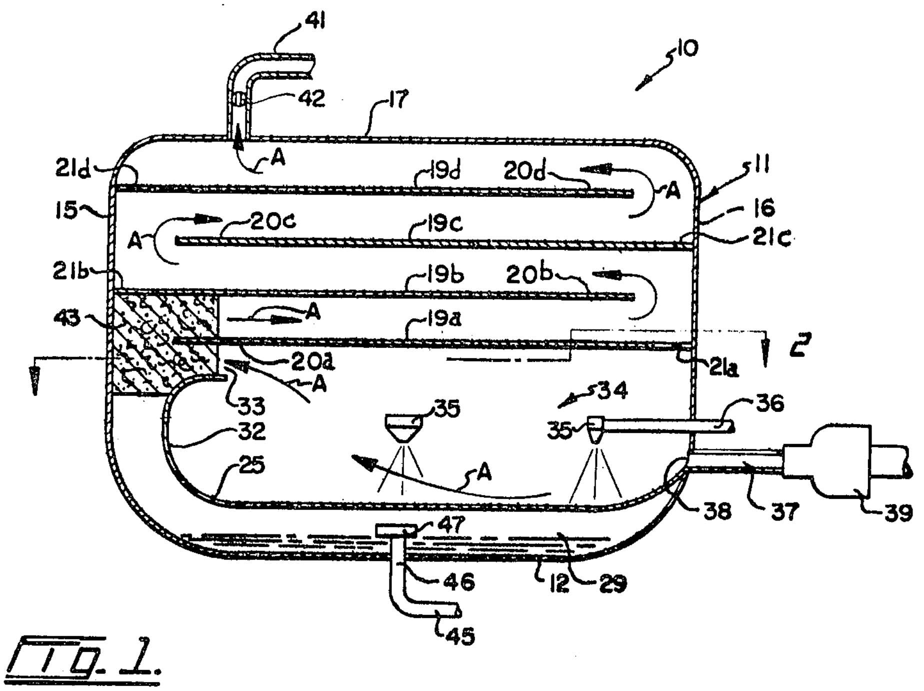
FIG. 1 is a side elevation in section of one form of the apparatus.
Figure 2:
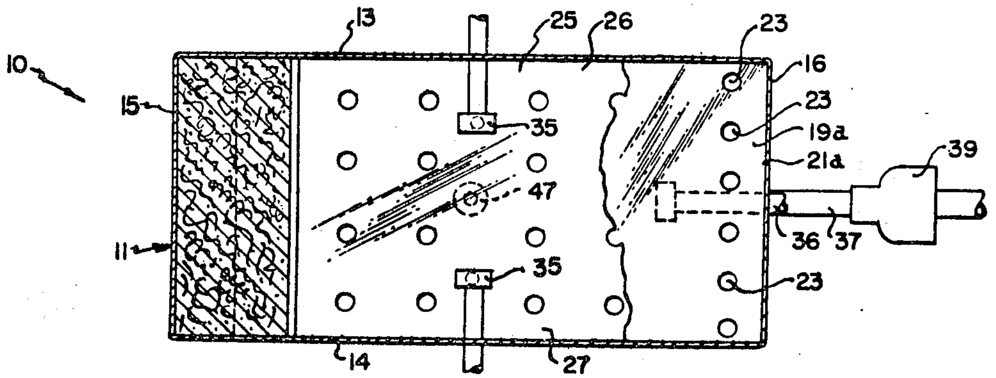
FIG. 2 is a section taken on the line 2—2 of FIG. 1.
Figure 3:
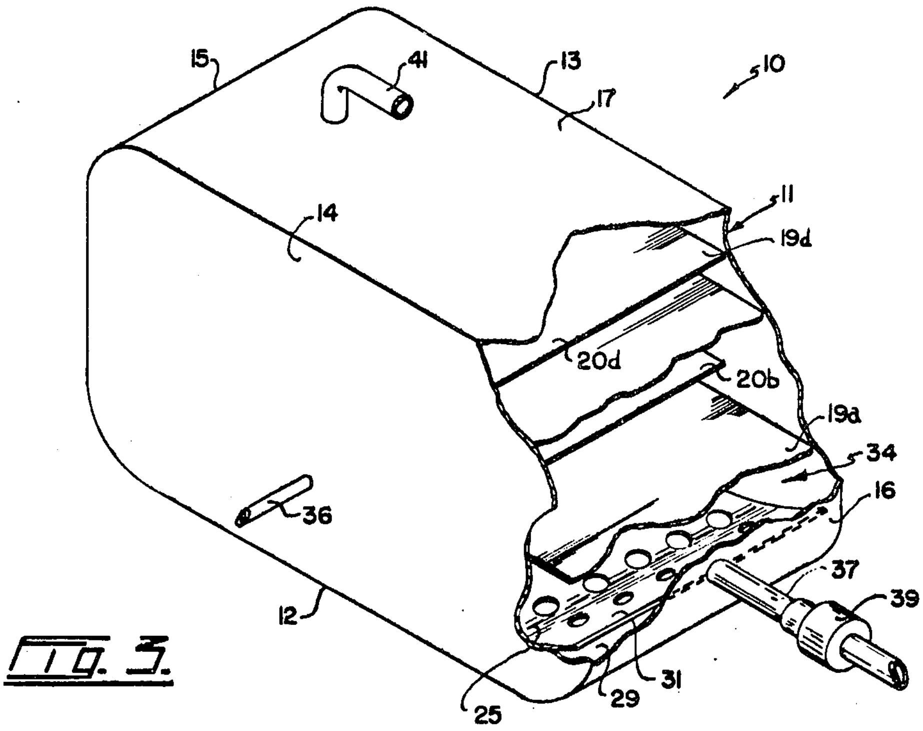
FIG. 3 is an isometric view of the apparatus in which certain elements of parts thereof are cut away or removed for purposes of clarification.

Referring to the drawings and specifically to FIGS. 1, 2 and 3, the numeral 10 generally represents a carburetor comprising a casing 11, which in the preferred form is rectangular in shape having a bottom 12, side walls 13 and 14, end walls 15 and 16, and a top 17, the casing 11 being rounded as shown in FIGS. 1 and 3, at the intersection of walls, top and bottom. Inside the casing and secured to the side walls thereof by welding or the like are a series of horizontal vertically spaced plates **19*a* to 19*d* inclusive, plate 19*a* being spaced above the bottom 12 of the casing and plate 19*d* being spaced downwardly from the top 17 thereof. Each of the plates 19*a* to 19*d* are alterantely spaced at their ends 20*a* to 20*d* respectively from the end walls 15 and 16 of the casing, and are provided near their other ends 21*a* to 21*d* inclusive with a series of holes 23** formed therethrough.

The carburetor 10 is also provided with a perforated spray plate 25. This latter plate is of the same width as the casing 11 and is secured along its sides 26 and 27 to side walls 13 and 14 respectively, and lies horizontally above the bottom 12 of the casing, the space therebetween forming a sump 29. One end 31 of the spray plate 25 is secured to end wall 16 of the casing and the other end 32 of the spray plate follows the curvature of the casing near the intersection of end wall 16 and bottom 12 and turns back upon itself beneath and spaced from the end **20*a* of plate 19*a* to form a throat 33**.

The space defined by plate **19*a*, end wall 16 and spray plate 25 forms a chamber, hereinafter called a mixing chamber 34, the chamber being provided with a plurality of atomizing nozzles 35 connected to fuel conduits 36 which supply the atomizing nozzles with fuel from a source not shown. The atomizing nozzles in the preferred form of the invention are of a standard fuel atomizing type and are located above the spray plate 25**, and direct a spray of liquid fuel, such as gasoline, towards the latter plate.

The mixing chamber 34 is provided with an air inlet conduit 37 having a port 38 lying below the horizontal plane of the atomizing nozzles 35, said conduit being connected to a powered air blower 39. The casing 11 is provided at its top 17 with a discharge pipe 41 which is led to the intake manifold of a combustion engine, not shown. The delivery of gases through the conduit 41 is controlled by a valve 42 which may be operated by, say the ascellerator pedal of an automobile, not shown.

The carburetor 10 is also provided with a metallic gauze type filter 43 filling the throat 33 between the spray plate 25 and plate **19*a*, and with a sump discharge pipe 45 which protrudes vertically through the bottom 12 of the casing into the space between the spray plate and said bottom, having at its upper end 46 a float valve 47 and being connected at its other end, not shown, to a reservoir or tank, not shown, from which the liquid fuel is pumped to the atomizing nozzles 35**.

In operation, the entering air which is forced into the casing 11 by the blower 39 passes through the mixing chamber 34, thence through the filter 43 to follow a tortuous course as shown by the arrows marked A between the plates **19*a* to 19*d*, thence out the discharge pipe 41**.

As the air passes through the spray of fuel as emitted by the atomizing nozzles 35, a certain amount of said fuel is vaporized and will therefore pass, as vapor, freely through the filter and along the tortuous passage formed by said plates **19*a* to 19*d*. It will be appreciated that if the velocity of the air is very great, and if the fuel is sprayed in a very fine atomized form, a great deal of the fuel in atomized form will be carried along with the air. It is the purpose of filter 43 to filter out the droplets of fuel from the air-fuel mix allowing the non-vaporized fuel to percolate downwardly through the filter and then follow end walls 15 down to the sump 39. A certain amount of non-vaporized fuel will also fall through the perforated spray plate 25 also down to the sump. When the level of the liquid in the sump has reached a certain height, the float valve 47** is arranged to open and allow the liquid fuel to return to the reservoir as hereinbefore stated.

The air-vapor mixture flowing through the filter 43 may still carry a certain amount of fuel in droplet form. These droplets, however, will, during their passage through the passage formed by the plates at one point or another contact one of the plates and adhere thereto, and will gradually form into larger droplets which will travel to the ends 21*a* to 21*d* of the plates towards the holes 23 therein, through which the fuel will drop downwardly and eventually find its way back to the sump 29 to be collected therein and pumped back to the reservoir again as hereinbefore stated.

As shown in FIG. 1, the space defined by the top 17, end walls 15 and 16, and plate 19*d* may be enlarged to act as a storage chamber for the air vapor mix, the enlargement serving to reduce the velocity of the air therethrough and to allow any droplets of fuel if not collected by the filter 43 or the plates 19 to settle out on plate 19*d*.

It will be appreciated that, having regard to the arrangement of the parts of the carburetor 10, the fuel which has been exposed to the air in mixing chamber 34, filter 43 and between plates 19*a* to 19*d*, will provide an almost completely saturated air-vapor mix, said mix, by virtue of the construction of the carburetor, carrying substantially no non-vaporized fuel therewith, which, when mixed with air at the intake manifold of the combustion engine, not shown, will result in practically complete combustion in the firing chamber of the cylinders in the engine.

Figure 4:
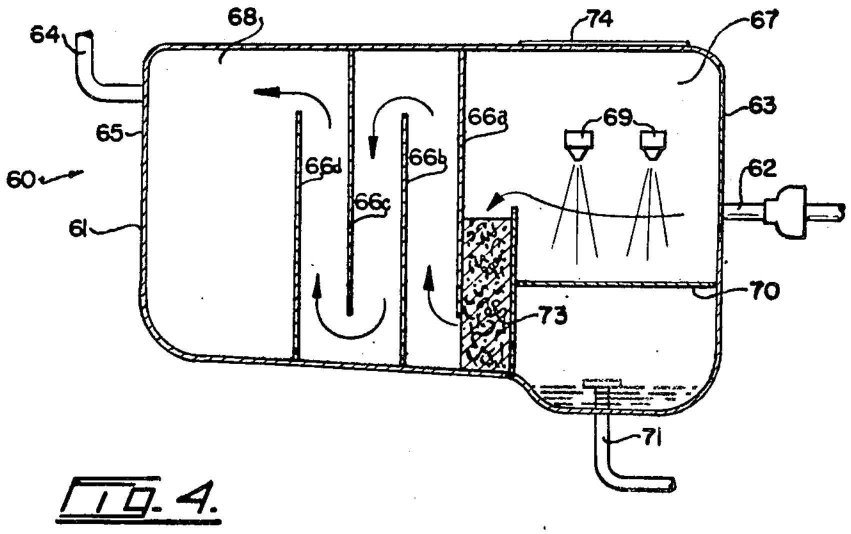
FIG. 4 is a view similar to FIG. 1 of an alternate form of the invention.

FIG. 4 depicts an alternate form of carburetor 60, having an horizontally enlongated casing 61. Carburetor 60 has an intake conduit 62 through the lower portion of an end wall 63 and a discharge pipe 64 at the upper portion of end wall 65. A series of vertically disposed horizontally spaced plates 66*a* to 66*d* secured in alternate fashion to the top and bottom of the casing to provide a tortuous passage therearound similar to the tortuous passage provided in carburetor 10 to lie substantially in the central portion of the casing providing a mixing chamber 67 and a storage chamber 68. Carburetor 60 also has fuel atomizing nozzles 69 in the mixing chamber 67 positioned to direct a spray of fuel downwardly upon a splash plate 70, and a float valve equipped sump drain 71 arranged therebelow to draw off liquid fuel.

A gauze type filter 73 is arranged at the bottom of plate 66a to act in the same manner as filter 43 of carburetor 10. The operation of carburetor 60 is exactly the same as that of carburetor 10, the filter 73 and plates 66*a* to 66*d*, removing substantially all nonvaporized fuel which passes from the mixing chamber through the tortuous passage provided by said plates, said non-vaporized fuel flowing downwardly on each side of the plates to the bottom of the carburetor from whence it is removed by the sump pipe 71.

Carburetor 60 is also provided with an inspection plate 74 to provide access to the atomizing nozzles in order that they may be serviced at regular intervals.

What we claim as our invention is:

1. A carburetor comprising a vertically elongated casing having an inlet port adjacent but spaced above its lower end and having an outlet port spaced above said inlet port, a series of horizontally elongated vertically spaced baffles in the casing arranged so that adjacent baffles are connected at opposite ends to opposite walls of the casing to form a tortuous passage between the inlet port and outlet port, the lowermost of said baffles being spaced above the inlet port and bottom of the casing to form a mixing chamber, a blower at the inlet port to pass a stream of air through the mixing chamber, a plurality of atomizing nozzles arranged in the mixing chamber above the stream of air being adapted when connected to a source of liquid fuel to discharge said fuel into said stream of air so as to produce an air-fuel mixture, a filter arranged in the passage to remove fuel in liquid form from said mixture, each of said baffles being provided with an aperture adjacent its connected end to permit fuel in liquid form collected thereon to pass therethrough and return to the mixing chamber, a sump arranged below the mixing chamber to receive said liquid fuel, and valve means automatically openable when the liquid fuel in the sump has reached a predetermined level to permit draining of said fuel therefrom.

2. A carburetor comprising a vertically elongated casing having an inlet port adjacent but spaced above its lower end and having an outlet port spaced above said inlet port, a series of horizontally elongated vertically spaced baffles in the casing arranged so that adjacent baffles are connected at opposite ends to opposite walls of the casing to form a tortuous passage between the inlet port and outlet port, the lowermost of said baffles being spaced above the inlet port and bottom of the casing to form a mixing chamber, a blower at the inlet port to pass a stream of air through the mixing chamber, a plurality of atomizing nozzles arranged in the mixing chamber above the stream of air adapted when connected to a source of liquid fuel to discharge said fuel into said stream of air so as to produce an air-fuel mixture, a horizontally elongated perforated plate in the mixing chamber arranged below the inlet port and spaced above the bottom of the casing to form the top wall of a sump, the latter serving to receive and retain fuel in liquid form not carried from the mixing chamber by the air stream, a filter in the passage to remove fuel in liquid form carried by the air stream from the mixing chamber, and valve means automatically openable when the liquid fuel in the sump has reached a predetermined level to permit draining of said fuel therefrom.

* * * * *